United States Patent
Zhang et al.

(10) Patent No.: US 9,964,791 B2
(45) Date of Patent: May 8, 2018

(54) DISPLAY PANEL, ITS DRIVING METHOD, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengju Zhang, Beijing (CN); Xin Li, Beijing (CN); Hong Zhu, Beijing (CN); Gang Yu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/205,795

(22) Filed: Jul. 8, 2016

(65) Prior Publication Data

US 2017/0192262 A1 Jul. 6, 2017

(30) Foreign Application Priority Data

Jan. 4, 2016 (CN) .......................... 2016 1 0003707

(51) Int. Cl.
| | | |
|---|---|---|
| G02F 1/37 | (2006.01) | |
| G02F 1/1343 | (2006.01) | |
| G02F 1/133 | (2006.01) | |
| G02F 1/1335 | (2006.01) | |
| G02F 1/1333 | (2006.01) | |
| H04R 3/00 | (2006.01) | |

(52) U.S. Cl.
CPC ............ *G02F 1/13338* (2013.01); *H04R 3/00* (2013.01); *H04R 2499/15* (2013.01)

(58) Field of Classification Search
CPC ................. G02F 3/137; G02F 3/13306; G02F 3/133512; G02F 3/134309; G02F 3/136204; G02F 3/136209; G09G 3/3648; G09G 3/3651
See application file for complete search history.

(56) References Cited

U.S. PATENT DOCUMENTS 7,154,568 B2 * 12/2006 Kim .................. G02F 1/136204
349/192
9,823,502 B2 * 11/2017 Alonso ............... G02F 1/13338
(Continued)

*Primary Examiner* — Sardis F Azongha
(74) *Attorney, Agent, or Firm* — Harness, Dickey & Pierce, P.L.C.

(57) ABSTRACT

The present disclosure provides a display panel, its driving method, and a display device. The display panel includes a first substrate and a second substrate arranged opposite to each other to form a cell, a liquid crystal layer arranged between the first substrate and the second substrate, and a pixel electrode arranged on the second substrate. A sensing electrode to which an external voltage is to be applied is arranged at a region of the first substrate corresponding to the liquid crystal layer. At a display stage, an electric field is generated between the sensing electrode to which the external voltage is applied and the pixel electrode to which a data voltage is applied, so as to drive liquid crystal molecules in the liquid crystal layer to deflect. The sensing electrode is a black matrix and/or color filter made of a conductive material and arranged on the first substrate.

16 Claims, 2 Drawing Sheets

(56) References Cited

U.S. PATENT DOCUMENTS

2008/0266497 A1* 10/2008 Chen ................. G02F 1/133512
  349/106
2012/0249912 A1* 10/2012 Huang ................. G02F 1/1362
  349/42
2016/0208545 A1* 7/2016 Baba ........................ E06B 3/70

* cited by examiner

United States Patent US 9,964,791 B2

DISPLAY PANEL, ITS DRIVING METHOD, AND DISPLAY DEVICE

CROSS-REFERENCE TO RELATED APPLICATION

The present application claims a priority of the Chinese Patent Application No. 201610003707.7 filed on Jan. 4, 2016, which is incorporated herein by reference in its entirety.

TECHNICAL FIELD

The present disclosure relates to the field of liquid crystal display technology, in particular to a display panel, its driving method and a display device.

BACKGROUND

Currently, along with the improvement of the living standards, the requirements on display devices are more demanding. The conventional display devices are of limited display functions, i.e., they are merely used to display images. For some special users, more display functions need to be provided, so as to improve the user experience.

Hence, there is an urgent need to provide a display panel with unique display functions.

SUMMARY

An object of the present disclosure is to provide a display panel, its driving method and a display device, so as to provide various display effects.

In one aspect, the present disclosure provides in some embodiments a display panel, including a first substrate and a second substrate arranged opposite to each other to form a cell, a liquid crystal layer arranged between the first substrate and the second substrate, and a pixel electrode arranged on the second substrate. A sensing electrode to which an external voltage is to be applied is arranged at a region of the first substrate corresponding to the liquid crystal layer. At a display stage, an electric field is generated between the sensing electrode to which the external voltage is applied and the pixel electrode to which a data voltage is applied, so as to drive liquid crystal molecules in the liquid crystal layer to deflect. The sensing electrode is a black matrix and/or color filter made of a conductive material and arranged on the first substrate.

Alternatively, the external voltage is generated by static electricity of human body from a user.

Alternatively, at the display stage, the display panel is in purple or green color after the liquid crystal molecules in the liquid crystal layer have been deflected due to the electric field generated between the sensing electrode to which the external voltage is applied and the pixel electrode to which the data voltage is applied.

In another aspect, the present disclosure provides in some embodiments a display device including the above-mentioned display panel.

Alternatively, the display device further includes a static electricity sensing member and a first logic switch, and the static electricity sensing member is configured to receive static electricity of human body from a user and connected to a sensing electrode via the first logic switch.

Alternatively, the static electricity sensing member is a contact point arranged at a region of the display device beyond the display panel.

Alternatively, the static electricity sensing member is a metallic ring at a periphery of a button on the display device.

Alternatively, the display device further includes a ground end and a second logic switch, and the ground end is capable of being connected to the sensing electrode via the second logic switch.

Alternatively, the display device further includes a driving module configured to control on and off states of the first logic switch and the second logic switch.

Alternatively, the on and off states of the first logic switch and the second logic switch are controlled by the button on the display device.

Alternatively, the display device further includes a control module and a loudspeaker, and the control module is connected to the static electricity sensing member and configured to control an operation of the loudspeaker in accordance with the static electricity of human body received by the static electricity sensing member.

In yet another aspect, the present disclosure provides in some embodiments a method for driving the display panel, including a step of, at a display stage, applying an external voltage to a sensing electrode and applying a data voltage to a pixel electrode, so as to drive liquid crystal molecules in a liquid crystal layer to deflect due to an electric field generated between the sensing electrode to which the external voltage is applied and the pixel electrode to which the data voltage is applied.

According to the embodiments of the present disclosure, through the sensing electrode which is arranged on a color filter substrate of the display substrate and to which the external voltage is to be applied, it is able to control the deflection of the liquid crystal molecules in accordance with the external voltage at the display stage, thereby to provide the display device with various display functions.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
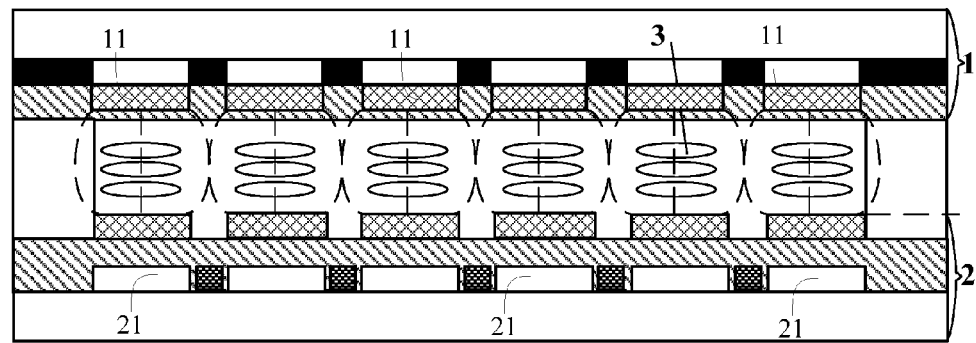
FIG. 1 is a schematic view showing a display panel according to one embodiment of the present disclosure.

As shown in FIG. 1, the present disclosure provides in some embodiments a display device, which includes a first substrate 1 and a second substrate 2 arranged opposite to each other to form a cell, a liquid crystal layer 3 arranged between the first substrate and the second substrate, and a pixel electrode 21 arranged on the second substrate 2. A sensing electrode 11 to which an external voltage is to be applied is arranged at a region of the first substrate 1 corresponding to the liquid crystal layer 3. At a display stage, an electric field is generated between the sensing electrode 11 to which the external voltage is applied and the pixel electrode 21 to which a data voltage is applied, so as to drive liquid crystal molecules in the liquid crystal layer 3 to deflect.

According to the display panel in the embodiments of the present disclosure, through the sensing electrode to which the external voltage is to be applied, it is able to control the deflection of the liquid crystal molecules in accordance with the external voltage at the display stage, thereby to provide the display panel with various display functions.

To be specific, in the embodiments of the present disclosure, a display operation of the display panel may be controlled in accordance with static electricity of human body from a user, i.e., the external voltage is generated by the static electricity of human body from the user. In the actual application, it is able to provide various display functions in accordance with the static electricity of human body from the user.

The display panel will be described hereinafter in more details.

Figure 2:
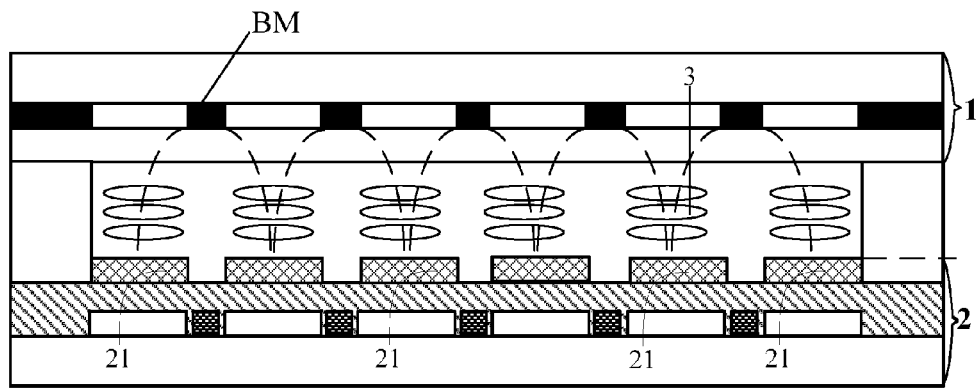
FIG. 2 is another schematic view showing the display panel according to one embodiment of the present disclosure.

As shown in FIG. 2, the display panel includes a color filter substrate 1 and an array substrate 2 arranged opposite to each other to form a cell, and a liquid crystal layer 3 arranged between the color filter substrate 1 and the array substrate 2.

In order to prevent the additional production cost, in the embodiments of the present disclosure, a black matrix BM on the color filter substrate may serve as the sensing electrode. The black matrix BM may be made of a conductive material, and manufactured by a conventional patterning process.

In the actual application, at the display stage, an electric field may be generated between the black matrix BM to which the external voltage is applied and a pixel electrode 21 therebelow, so as to drive the liquid crystal molecules in the liquid crystal layer to deflect, thereby to enable the display panel to display an image in a manner different from a normal mode. Based on this principle, the display panel in the embodiments of the present disclosure may detect the static electricity of human body from the user, or it may be used as a voltage detector. For example, at the display stage, the display panel is in purple or green color after the liquid crystal molecules in the liquid crystal layer have been deflected due to the electric field generated between the sensing electrode to which the external voltage is applied and the pixel electrode to which the data voltage is applied.

It should be appreciated that, in an alternative embodiment, any other patterns on the color filter substrate, e.g., a color filter, may also be used as the sensing electrode.

The present disclosure further provides in some embodiments a display device including the above-mentioned display panel, so as to control the deflection of the liquid crystal molecules in accordance with the external voltage at the display stage, thereby to provide the display device with various display functions.

To be specific, the display device further includes a static electricity sensing member 4 and a first logic switch 5. The static electricity sensing member 4 is configured to receive static electricity of human body from the user and connected to the sensing electrode via the first logic switch 5.

In the actual application, the static electricity sensing member 4 may be a contact point arranged at a region of the display device beyond the display panel. After the contact point is touched by a finger, the static electricity may be applied to the sensing electrode 11 on the color filter substrate 1 via the first logic switch 5.

In an alternative embodiment, in the case that the display panel is applied to a smart device such as a mobile phone or a flat-panel computer, the static electricity sensing member 4 may be formed integrally with a button on the smart device. For example, the static electricity sensing member 4 may be a metallic ring at a periphery of the button, and in the case that the button is touched by the finger, the finger may be in contact with the metallic ring.

In addition, in order to display an image normally, the external voltage applied to the sensing electrode needs to be released. In this regard, the display device further includes a ground end 6 and a second logic switch 7. The ground end 6 is capable of being connected to the sensing electrode 11 via the second logic switch 7. The sensing electrode 11 may be grounded in the case that the second logic switch 7 is turned on, so as to release the voltage applied thereto.

In the actual application, in the case that the display device is a smart device, it may further include a driving module 8, so as to control on and off states of the first logic switch 5 and the second logic switch 7 through software. The user may select to enable, or disable, the sensing electrode 11 through an operating system of the smart device. Alternatively, the on and off states of the first logic switch 5 and the second logic switch 7 may be controlled by the button on the display device, so as to control the sensing electrode 11 manually.

Figure 3:
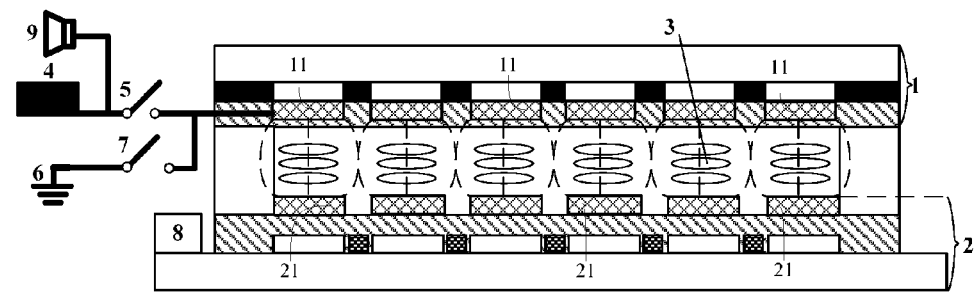
FIG. 3 is a schematic view showing a display device according to one embodiment of the present disclosure.
Figure 4:
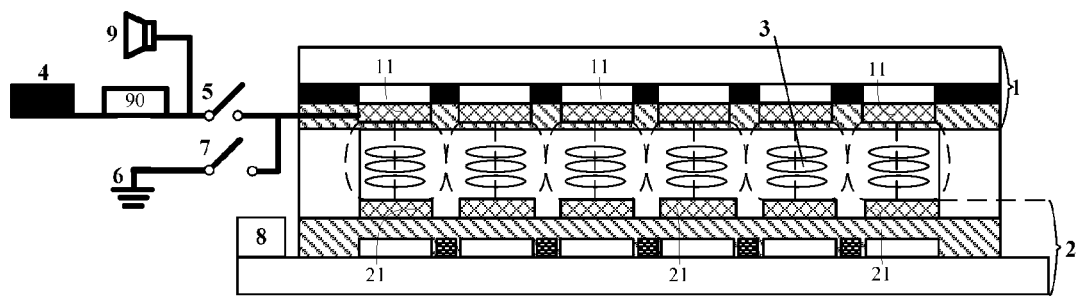
FIG. 4 is another schematic view showing the display device according to one embodiment of the present disclosure.

In the actual application, the display device may have a voltage detection function, so as to determine a value of the static electricity of human body. In an alternative embodiment, as shown in FIG. 3, the display device may further include a loudspeaker 9 connected to the static electricity sensing member 4. In the case that the value of the static electricity of human body is greater than a predetermined threshold, the loudspeaker 9 may make a sound, so as to prompt the user.

For example, in use, the user may touch the static electricity sensing member 4 before the first logic switch 5 is turned on. At this time, in the case that the loudspeaker 9 makes a sound, it means the static electricity of human body is of a value sufficient to break through a screen of the display device. In the case that the loudspeaker 9 does not make any sound, the first logic switch 5 may be turned on, so as to apply the static electricity to the sensing electrode, thereby to achieve various display functions.

Of course, a power amplifier may also be provided and connected between the loudspeaker 9 and the static electricity sensing member 4, so as to amplify the static electricity to drive the loudspeaker to make a sound. In an embodiment, a control module 90 may also be provided between the loudspeaker 9 and the static electricity sensing member 4, and after detecting the static electricity, the control module may apply a larger voltage to the loudspeaker 9 to drive it to make a sound.

The present disclosure further provides in some embodiments a method for driving the display panel, which includes a step of, at the display stage, applying the external voltage to the sensing electrode and applying the data voltage to the pixel electrode, so as to drive the liquid crystal molecules in the liquid crystal layer to deflect due to the electric field generated between the sensing electrode to which the external voltage is applied and the pixel electrode to which the data voltage is applied.

According to the method in the embodiments of the present disclosure, it is able to provide the display panel with various display function through the external voltage.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display device, comprising:
   a display panel that comprises a first substrate and a second substrate arranged opposite to each other to form a cell, a liquid crystal layer arranged between the first substrate and the second substrate, and a pixel electrode arranged on the second substrate, wherein a sensing electrode to which an external voltage is to be applied is arranged at a region of the first substrate corresponding to the liquid crystal layer;
   at a display stage, an electric field is generated between the sensing electrode to which the external voltage is applied and the pixel electrode to which a data voltage is applied, to drive liquid crystal molecules in the liquid crystal layer to deflect;
   the sensing electrode is a black matrix and/or color filter made of a conductive material and arranged on the first substrate; and
   a static electricity sensing member and a first logic switch, wherein the static electricity sensing member is configured to receive static electricity of human body from a user and connected to the sensing electrode via the first logic switch,
   wherein the static electricity sensing member is a contact point arranged at a region of the display device beyond the display panel, and
   wherein the static electricity sensing member is a metallic ring at a periphery of a button on the display device.

2. The display device according to claim 1, further comprising a ground end and a second logic switch, wherein the ground end is capable of being connected to the sensing electrode via the second logic switch.

3. The display device according to claim 2, further comprising a driving module configured to control on and off states of the first logic switch and the second logic switch.

4. The display device according to claim 2, wherein on and off states of the first logic switch and the second logic switch are controlled by a button on the display device.

5. The display device according to claim 1, further comprising a control module and a loudspeaker, wherein the control module is connected to the static electricity sensing member and configured to control an operation of the loudspeaker in accordance with the static electricity of human body received by the static electricity sensing member.

6. The display device according to claim 1, wherein the external voltage is generated by static electricity of human body from the user.

7. The display device according to claim 1, wherein the sensing electrode is a black matrix and/or color filter made of a conductive material and arranged on the first substrate.

8. The display device according to claim 1, wherein at the display stage, the display panel is in purple or green color after the liquid crystal molecules in the liquid crystal layer have been deflected due to the electric field generated between the sensing electrode to which the external voltage is applied and the pixel electrode to which the data voltage is applied.

9. A display device, comprising
   a display panel that comprises a first substrate and a second substrate arranged opposite to each other to form a cell, a liquid crystal layer arranged between the first substrate and the second substrate, and a pixel electrode arranged on the second substrate, wherein a sensing electrode to which an external voltage is to be applied is arranged at a region of the first substrate corresponding to the liquid crystal layer; at a display stage, an electric field is generated between the sensing electrode to which the external voltage is applied and the pixel electrode to which a data voltage is applied, to drive liquid crystal molecules in the liquid crystal layer to deflect; and the sensing electrode is a black matrix and/or color filter made of a conductive material and arranged on the first substrate,
   a static electricity sensing member and a first logic switch, wherein the static electricity sensing member is configured to receive static electricity of human body from a user and connected to the sensing electrode via the first logic switch, and
   a ground end and a second logic switch, wherein the ground end is capable of being connected to the sensing electrode via the second logic switch,
   wherein on and off states of the first logic switch and the second logic switch are controlled by a button on the display device.

10. The display device according to claim 9, further comprising a driving module configured to control on and off states of the first logic switch and the second logic switch.

11. The display device according to claim 9, further comprising a control module and a loudspeaker, wherein the control module is connected to the static electricity sensing member and configured to control an operation of the loudspeaker in accordance with the static electricity of human body received by the static electricity sensing member.

12. The display device according to claim 9, wherein the external voltage is generated by static electricity of human body from the user.

13. The display device according to claim 9, wherein at the display stage, the display panel is in purple or green color after the liquid crystal molecules in the liquid crystal layer have been deflected due to the electric field generated between the sensing electrode to which the external voltage is applied and the pixel electrode to which the data voltage is applied.

14. A display device, comprising
   a display panel that comprises a first substrate and a second substrate arranged opposite to each other to form a cell, a liquid crystal layer arranged between the first substrate and the second substrate, and a pixel electrode arranged on the second substrate, wherein a sensing electrode to which an external voltage is to be applied is arranged at a region of the first substrate corresponding to the liquid crystal layer; at a display stage, an electric field is generated between the sensing electrode to which the external voltage is applied and the pixel electrode to which a data voltage is applied, to drive liquid crystal molecules in the liquid crystal layer to deflect; and the sensing electrode is a black matrix and/or color filter made of a conductive material and arranged on the first substrate, a control module; and a loudspeaker, wherein the control module is connected to the static electricity sensing member and configured to control an operation of the loudspeaker in accordance with the static electricity of human body received by the static electricity sensing member.

15. The display device according to claim 14, wherein the external voltage is generated by static electricity of human body from the user.

16. The display device according to claim 14, wherein at the display stage, the display panel is in purple or green color after the liquid crystal molecules in the liquid crystal layer have been deflected due to the electric field generated between the sensing electrode to which the external voltage is applied and the pixel electrode to which the data voltage is applied.

* * * * *